(12) United States Patent
Hally et al.

(10) Patent No.: US 11,579,926 B2
(45) Date of Patent: Feb. 14, 2023

(54) PROCESSING REST API REQUESTS BASED ON RESOURCE USAGE SATISFYING PREDETERMINED LIMITS

(71) Applicant: EMC IP HOLDING COMPANY LLC, Hopkinton, MA (US)

(72) Inventors: Aidan Hally, Fermoy (IE); Paul Mcsweeney, Silversprings (IE); Kenneth Byrne, Knockraha (IE)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 248 days.

(21) Appl. No.: 16/785,759

(22) Filed: Feb. 10, 2020

(65) Prior Publication Data
US 2021/0248007 A1 Aug. 12, 2021

(51) Int. Cl.
*G06F 9/50* (2006.01)
*G06F 9/54* (2006.01)
*G06F 11/07* (2006.01)

(52) U.S. Cl.
CPC .......... *G06F 9/5016* (2013.01); *G06F 9/5027* (2013.01); *G06F 9/541* (2013.01);
(Continued)

(58) Field of Classification Search
CPC .... G06F 9/5016; G06F 9/541; G06F 11/0727; G06F 11/0772; G06F 9/5027; G06F 11/076; G06F 2209/5013
See application file for complete search history.

(56) References Cited

U.S. PATENT DOCUMENTS 10,291,730 B1 * 5/2019 Shavell ................. H04M 15/60
10,403,358 B2 * 9/2019 Shimizu ............... G11C 13/004
(Continued)

FOREIGN PATENT DOCUMENTS

CN        108900508 A  * 11/2018 .......... G06F 11/3476
JP        2012156758 A *  8/2012

OTHER PUBLICATIONS

Otaka, Yuki, JP2012156758A Description Translation, Aug. 16, 2012 [database online], [retrieved on Apr. 20, 2022] Retrieved from Espacenet using Internet <URL:https://worldwide.espacenet.com/publicationDetails/description?CC=JP&NR=2012156758A&KC=A&FT=D&ND=3&date=20120816&DB=&locale=en_EP>, pp. 1-25 (Year: 2012).*

(Continued)

*Primary Examiner* — Meng Ai T An
*Assistant Examiner* — Hsing Chun Lin
(74) *Attorney, Agent, or Firm* — Anderson Gorecki LLP

(57) ABSTRACT

A request manager analyzes API calls from a client to a host application for state and performance information. If current utilization of host application processing or memory footprint resources exceed predetermined levels, then the incoming API call is not forwarded to the application. If current utilization of the host application processing and memory resources do not exceed the predetermined levels, then the request manager quantifies the processing or memory resources required to report the requested information and determines whether projected utilization of the host application processing or memory resources inclusive of the resources required to report the requested information exceed predetermined levels. If the predetermined levels are not exceeded, then the request manager forwards the API call to the application for processing.

18 Claims, 2 Drawing Sheets

(52) U.S. Cl.
CPC ........ *G06F 11/076* (2013.01); *G06F 11/0727* (2013.01); *G06F 11/0772* (2013.01); *G06F 2209/5013* (2013.01)

(56) References Cited

U.S. PATENT DOCUMENTS

| | | | |
|---|---|---|---|
| 10,521,368 B2 * | 12/2019 | Batley | G06F 12/128 |
| 2009/0216707 A1 * | 8/2009 | Keohane | G06F 16/1737 |
| 2013/0111010 A1 * | 5/2013 | Driesen | G06F 9/505 |
| | | | 709/224 |
| 2014/0223444 A1 * | 8/2014 | Keeton | G06F 9/50 |
| | | | 718/104 |
| 2017/0093629 A1 * | 3/2017 | Cong | H04L 41/0816 |
| 2019/0007747 A1 * | 1/2019 | Bernat | H04L 29/08954 |

OTHER PUBLICATIONS

Huang et al. CN108900508A Description Translation, Nov. 27, 2018 [database online], [retrieved on Apr. 20, 2022] Retrieved from Espacenet using Internet <URL:https://worldwide.espacenet.com/publicationDetails/description?CC=CN&NR=108900508A&KC=A&FT=D&ND=3&date=20181127&DB=&locale=en_EP>, pp. 1-35 (Year: 2018).*

* cited by examiner

PROCESSING REST API REQUESTS BASED ON RESOURCE USAGE SATISFYING PREDETERMINED LIMITS

TECHNICAL FIELD

The subject matter of this disclosure is generally related to processing application programming interface (API) calls for state and performance information.

BACKGROUND

The management tools for computer networks including but not limited to storage systems are becoming more automated. Historically, network administrators used management stations to manually obtain state and performance information about network elements such as servers and the applications running on the network elements. Requests for information were manually generated in the sense that an administrator created each request individually. The state and performance information collected in response to the requests was used by the network administrators to determine appropriate actions to be performed on the network elements. Recently, organizations have implemented "zero touch" management systems that automate management tasks such as generation of requests for state and performance information using scripts and programs that generate and send hundreds or thousands of API calls over a short period of time without administrator intervention. Examples of third-party tools that are used in zero touch systems include SPLUNK and Ansible. Splunk is a software platform for searching and analyzing data. Ansible is a tool for software provisioning, configuration management, and application deployment. A software architectural style used by network administrators and third-party tools is representational state transfer (REST) using Hyper Text Transfer Protocol (HTTP). Applications that run on network elements typically have REST APIs for receiving API calls as requests for state and performance information in zero touch systems. The volume of REST API calls generated by zero touch management systems may degrade performance of network elements.

SUMMARY

All examples, aspects and features mentioned in this document can be combined in any technically possible way.

In accordance with some implementations an apparatus comprises a host comprising: processing resources; memory resources; an application that reports state and performance information responsive to client requests; and a request manager responsive to a request from a client for state or performance information to provide the request to the application responsive to verification of predetermined conditions indicative that a portion of the processing resources and the memory resources required to report the state and performance information to the client will not cause utilization of application processing and memory resources to exceed predetermined limits. The predetermined conditions may comprise a threshold for current utilization of the memory resources. The memory resources may comprise a memory footprint of the application, and the predetermined conditions may comprise a threshold for current utilization percentage of the memory footprint of the application. The predetermined conditions may comprise a threshold for current utilization of the processing resources. The processing resources may comprise a central processing unit on which the hosted application runs, and the predetermined conditions may comprise a threshold for current utilization percentage of the central processing unit. Some implementations comprise a REST API endpoint data set indicative of prior resource utilizations required to process a plurality of types of requests for host state or performance information. The request manager may use the endpoint data set to determine required processing resources to provide the host state or performance information indicated by the request. The predetermined conditions may comprise a threshold for projected utilization of the processing resources that is compared with currently utilized processing resources in combination with the required processing resources. The request manager may use the endpoint data set to determine required memory resources to provide the host state or performance information indicated by the request. The predetermined conditions may comprise a threshold for projected utilization of the memory resources that is compared with currently utilized memory resources in combination with the required memory resources. The request manager may retry verification of the predetermined conditions up to a maximum number of retries responsive to failure to satisfy the predetermined conditions. The request manager may send an error message to the client responsive to failure to satisfy the predetermined conditions within the maximum number of retries.

In accordance with some implementations a method comprises: responsive to a request from a client for state or performance information associated with a host comprising processing resources, memory resources, an application that reports state and performance information responsive to client requests: providing the request to the application contingent on verifying that predetermined conditions indicative that a portion of the processing resources and the memory resources required to report the state and performance information to the client will not cause utilization of application processing and memory resources to exceed predetermined limits; and sending an error message to the host responsive to failing to verify that the predetermined conditions are satisfied. The memory resources may comprise a memory footprint of the application and verifying may comprise determining that current utilization of the application memory footprint does not exceed a threshold. The processing resources may comprise a central processing unit on which the hosted application runs and verifying may comprise determining that current utilization of the central processing unit does not exceed a threshold. Verifying may comprise comparing a threshold for projected utilization of the processing resources with currently utilized processing resources in combination with the required processing resources. Verifying may comprise comparing a threshold for projected utilization of the memory resources with currently utilized memory resources in combination with the required memory resources. Some implementations comprise updating an endpoint data set with the required memory resources. Some implementations comprise retrying verification of the predetermined conditions up to a maximum number of retries responsive to failure to satisfy the predetermined conditions. Some implementations comprise sending an error message to the client responsive to failure to satisfy the predetermined conditions within the maximum number of retries.

Other aspects, features, and implementations may become apparent in view of the detailed description and figures.

DETAILED DESCRIPTION

Figure 1:
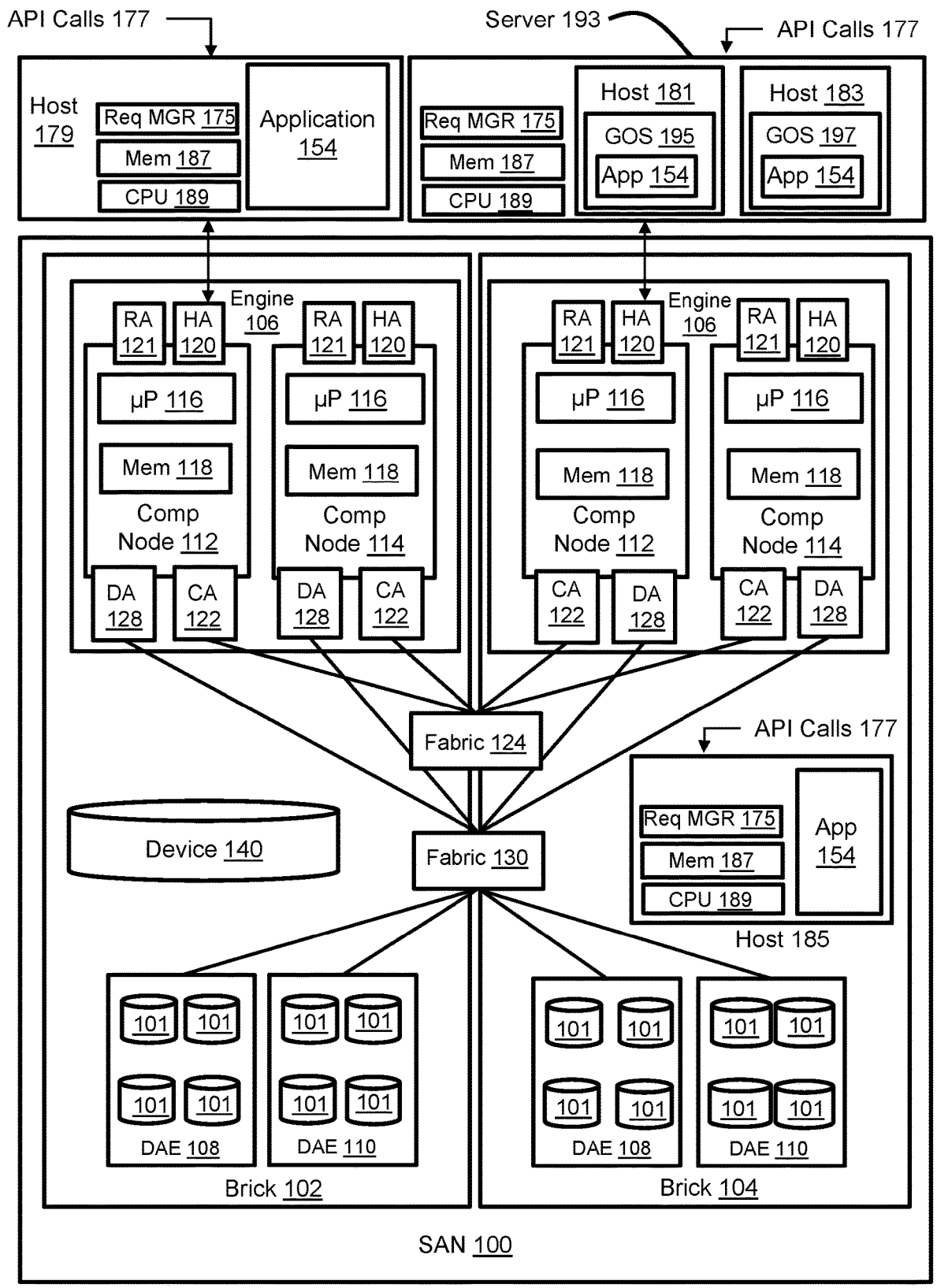
FIG. 1 illustrates a storage system in which request managers control processing of API calls.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof.

Aspects of the inventive concepts are described as being implemented in a data storage system that includes host servers and a SAN. Such implementations should not be viewed as limiting. Those of ordinary skill in the art will recognize that there are a wide variety of implementations of the inventive concepts in view of the teachings of the present disclosure. Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Although automation of request generation facilitates management of complex networks such as data centers, an excessive number of API calls to request state and performance information may be generated by automated management systems. Additional API calls place an additional burden on network elements relative to manual management. Usage of computational, memory, and other resources for processing API calls may increase proportionally with the increase in the number and rate of automatically generated API calls. If the resources of a network element are fully utilized for performance of other tasks, then the level of performance of those tasks may suffer as a result of allocation of resources for processing API calls. In some cases, an excessive number of API calls may cause a network element to become resource-starved, unable to handle API calls within an acceptable timeframe, or crash.

FIG. 1 illustrates a storage system in which request managers 175 control processing of API calls 177 by hosts 179, 181, 183, 185. The illustrated example includes three different types of hosts, which are also referred to as "elements." Host 179 is a server that includes memory 187 and processing resources including a CPU 189 that is used to run an instance of a hosted application 154. The hosted application is responsive to API calls to provide requested state and performance information. Hosts 181, 183 are virtual machines running on a server 193. Each virtual machine host 181, 183 has a respective guest operating system 195, 197 on which an instance of the hosted application 154 runs. Host 185 runs on a SAN 100, e.g. as a virtual machine or container with dedicated resources including memory 187 and CPU 189. As will be explained in greater detail below, each instance of the request manager 175 controls forwarding of API calls 177 from clients to the applications on the host with which that request manager is co-located, e.g. to avoid overloading the host.

The SAN 100, which may be referred to as a storage array, includes one or more bricks 102, 104. Each brick includes an engine 106 and one or more DAEs (drive array enclosures) 108, 110. Each drive array enclosure includes managed drives 101 of one or more technology types. Examples may include, without limitation, SSDs such as flash and HDDs with spinning disk storage media. Each engine 106 includes a pair of interconnected computing nodes 112, 114, which may be referred to as "storage directors." Each computing node includes resources such as at least one multi-core processor 116 and local memory 118. The processor may include CPUs (Central Processing Units), GPUs (Graphics Processing Units), or both. The local memory 118 may include volatile RAM (Random-Access Memory) of any type, NVM (Non-Volatile Memory) such as SCM (Storage Class Memory), or both. Each computing node includes one or more HAs (host adapters) 120 for communicating with the hosts 150, 152. Each host adapter has resources for servicing IOs, e.g. processors, volatile memory, and ports via which the hosts may access the SAN node. Each computing node also includes an RA (remote adapter) 121 for communicating with other storage systems. Each computing node also includes one or more DAs (drive adapters) 122 for communicating with the managed drives 101 in the disk array enclosures 108, 110. Each drive adapter has resources for servicing IOs, e.g. processors, volatile memory, and ports via which the computing node may access the drive array enclosures. Each computing node may also include one or more CAs (channel adapters) 122 for communicating with other computing nodes via an interconnecting fabric 124. Each computing node may allocate a portion or partition of its respective local memory 118 to a shared memory that can be accessed by other computing nodes, e.g. via DMA (Direct Memory Access) or RDMA (Remote DMA). The paired computing nodes 112, 114 of each engine 106 provide failover protection and may be directly interconnected by communication links. An interconnecting fabric 130 enables implementation of an N-way active-active backend. A backend connection group includes all drive adapters that can access the same drive or drives. In some implementations every drive array 128 in the storage array can reach every disk array enclosure via the fabric 130. Further, in some implementations every drive adapter in the SAN can access every managed drive 101 in the SAN.

Data associated with instances of the hosted application 154 running on the hosts is maintained on the managed drives 101 of the SAN 100. The managed drives 101 are not discoverable by the hosts but the SAN 100 creates a logical storage device 140 that can be discovered and accessed by the hosts. Without limitation, the logical storage device may be referred to as a "source device" or simply "device," production volume, production device, or production LUN, where LUN (Logical Unit Number) is a number used to identify logical storage volumes in accordance with the SCSI (Small Computer System Interface) protocol. In the illustrated example logical storage device 140 is used by instances of host application 154 for storage of host application data. From the perspective of the hosts, the logical storage device 140 is a single drive having a set of contiguous fixed-size LBAs (logical block addresses) on which data used by the instances of the host application resides. However, the host application data is stored at non-contiguous addresses on various managed drives 101.

To service IOs from instances of a hosted application 154 the SAN 100 maintains metadata that indicates, among various things, mappings between LBAs of the logical storage devices 140, 141 and addresses with which extents of host application data can be accessed from the shared memory and managed drives 101. In response to a data access command from an instance of hosted application 154 to READ data from the production volume 140 the SAN uses the metadata to find the requested data in the shared memory or managed drives. When the requested data is already present in memory when the command is received it is considered a "cache hit." When the requested data is not in the shared memory when the command is received it is considered a "cache miss." In the event of a cache miss the accessed data is temporarily copied into the shared memory from the managed drives and used to service the IO, i.e. reply to the hosted application with the data via one of the computing nodes. In the case of a WRITE to one of the production volumes the SAN copies the data into the shared memory, marks the corresponding logical storage device location as dirty in the metadata, and creates new metadata that maps the logical storage device address with a location to which the data is eventually written on the managed drives. READ and WRITE "hits" and "misses" occur depending on whether the stale data associated with the IO is present in the shared memory when the IO is received.

Figure 2:
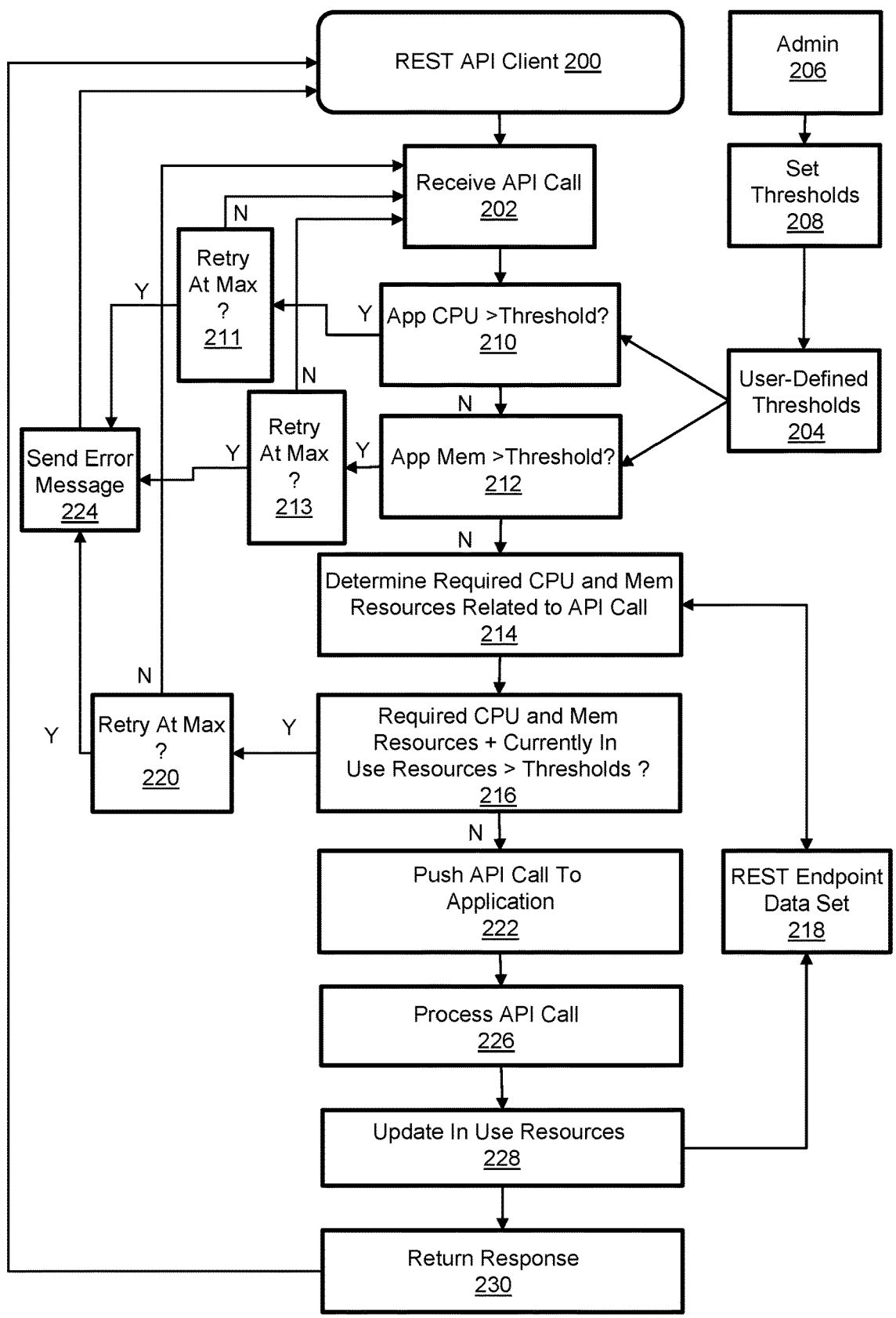
FIG. 2 illustrates operation of an individual instance of a request manager.

FIG. 2 illustrates operation of an individual instance of the request manager 175 (FIG. 1). An administrator 206 pre-configures the request manager with user-defined request control thresholds 204 as conditions for API call processing as indicated in step 208. In the illustrated example the request control thresholds include thresholds (max values) for application CPU utilization and application memory footprint utilization, e.g. a percentage of the CPU and memory footprint used to support the application instance 154 (FIG. 1). However, some implementations may alternatively or additionally use one or more of thresholds for microprocessor utilization, GPU utilization, utilization of multiple processors, memory utilization, and stack utilization, in any combination. A REST API client 200 automatically generates an API call (request) to obtain state and performance information. The request manager receives the incoming API call from the REST API client as indicated in step 202. The request manager determines whether current application CPU utilization is greater than the user-defined application CPU utilization threshold as indicated in step 210. For example, if the application CPU utilization threshold is set to 90% and the CPU running the hosted application is currently at 95% utilization then the 90% threshold is exceeded. If the current application CPU utilization exceeds the user-defined threshold for application CPU utilization, then the API call may be retried as indicated by looping back to step 202 provided that the retry count limit has not reached a maximum limit as indicated in step 211. If the retry count limit has reached the maximum limit, then a "server busy" error message is sent to the REST API client as indicated in step 224. If the current application CPU utilization does not exceed the user-defined threshold for application CPU utilization as determined in step 210 then the request manager determines whether the current application memory footprint utilization is greater than the user-defined application memory footprint utilization threshold as indicated in step 212. For example, if the application memory footprint utilization threshold is set to 90% and 80% of the application memory footprint is currently allocated then the threshold is not exceeded. If the current application memory footprint utilization exceeds the user-defined threshold then the API call may be retried as indicated by looping back to step 202 provided that the retry count limit has not reached a maximum limit as indicated in step 213. If the retry count limit has reached the maximum limit, then a "server busy" error message is sent to the REST API client as indicated in step 224. If the current application memory footprint utilization does not exceed the user-defined threshold then the request manager quantifies the application CPU resources and application memory footprint resources required to process the API call as indicated in step 214. Quantification of the required resources may be determined with reference to a REST API endpoint data set 218 of resource usage associated with previously processed API calls. For example, the average resource usage values of all similar API calls in the data set may be used as the required resource values.

After quantifying the required resources, the request manager determines whether utilization of the additional resources required to process the API call would cause the user-defined thresholds to be exceeded as indicated in step 216. For example, if the CPU utilization threshold is set to 90% and the CPU allocated to the hosted application is currently at 80% utilization and the CPU resources required to process the API call would increase CPU utilization to 85% then the threshold would not be exceeded. If utilization of the additional required resources would cause either or both the CPU and application memory footprint utilization thresholds to be exceeded, then the request manager determines whether a retry count has reached a predetermined maximum value as indicated in step 220. For example, and without limitation, the retry maximum value may be set to two, three, or four retries. If the retry count has not reached the maximum value, then the API call is retried as indicated by looping back to step 202. If the retry count has reached the maximum value, then a "server busy" error message is sent to the REST API client 200 and the API call is removed from the buffer as indicated in step 224.

If utilization of the additional resources required to process the API call would not cause one or both thresholds to be exceeded, then the request manager pushes the API call (request) to the application as indicated in step 222. The application processes the request as indicated in step 226. The current state of utilization of resources including the additional resources required to process the API call is updated as indicated in step 228 and used to update the REST endpoint data set 218. The REST endpoint data set may include a listing of resources required to process various types of API calls in addition to current utilization state. Processing of the API call is concluded by returning a response as indicated in step 230.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus comprising:
   a host comprising:
   processing resources;
   memory resources;
   an application that is allocated some of the processing resources and some of the memory resources as application processing resources and application memory resources, the application configured to report state and performance information responsive to representational state transfer (REST) requests from clients; and
   a request manager responsive to a first REST request from a client for current state and performance information of the host to:
   provide the first REST request to the application contingent on satisfaction of predetermined conditions comprising a determination that current utilization of the application processing resources and the application memory resources by the application plus additional portions of the application processing resources and the application memory resources required to report the current state and performance information of the host to the client will not cause utilization of the application processing and application memory resources to exceed predetermined limits; and
   return an error message to the client responsive to a determination that the current utilization of the application processing resources and the application memory resources by the application plus the additional portions of the application processing resources and the application memory resources required to report the current state and performance information of the host to the client will cause utilization of the application processing and application memory resources to exceed the predetermined limits and a determination that a number of retries to satisfy the predetermined limits has reached a maximum number of retries.

2. The apparatus of claim 1 wherein the predetermined conditions further comprise the current utilization of the application memory resources by the application being under a threshold for current utilization of the application memory resources by the application prior to determining whether the current utilization of the application processing resources and the application memory resources by the application plus the additional portions of the application processing resources and the application memory resources required to report the current state and performance information of the host to the client will cause utilization of the application processing and application memory resources to exceed the predetermined limits.

3. The apparatus of claim 1 wherein the application memory resources comprise a memory footprint of the application, and wherein the predetermined conditions further comprise current utilization percentage of the memory footprint of the application being under a threshold for current utilization percentage of the memory footprint of the application.

4. The apparatus of claim 1 wherein the predetermined conditions further comprise the current utilization of the application processing resources by the application being under a threshold for current utilization of the application processing resources by the application prior to determining whether the current utilization of the application processing resources and the application memory resources by the application plus the additional portions of the application processing resources and the application memory resources required to report the current state and performance information of the host to the client will cause utilization of the application processing and application memory resources to exceed the predetermined limits.

5. The apparatus of claim 1 wherein the application processing resources comprise a central processing unit on which the application runs, and wherein the predetermined conditions further comprise current utilization percentage of the central processing unit being under a threshold for current utilization percentage of the central processing unit.

6. The apparatus of claim 1 further comprising an endpoint data set indicative of prior resource utilizations required to process a plurality of types of requests for the current state and performance information of the host.

7. The apparatus of claim 6 wherein the request manager uses the endpoint data set to determine required application processing resources to provide the current state and performance information of the host indicated by the first REST request.

8. The apparatus of claim 7 wherein the predetermined conditions further comprise a threshold for projected utilization of the application processing resources that is compared with currently utilized application processing resources in combination with the required application processing resources.

9. The apparatus of claim 8 wherein the request manager uses the endpoint data set to determine required application memory resources to provide the current state and performance information of the host indicated by the first REST request.

10. The apparatus of claim 9 wherein the predetermined conditions comprise a threshold for projected utilization of the application memory resources that is compared with the currently utilized application memory resources in combination with the required application memory resources.

11. The apparatus of claim 1 wherein the request manager retries the determination that the current utilization of the application processing resources and the application memory resources by the application plus the additional portions of the application processing resources and the application memory resources required to report the current state and performance information of the host to the client will not cause utilization of the application processing and application memory resources to exceed the predetermined limits up to a maximum number of retries before returning the error message.

12. A method comprising:
    responsive to a first representational state transfer (REST) request from a client for current state and performance information of a host comprising processing resources, memory resources, and an application that is allocated some of the processing resources and some of the memory resources as application processing resources and application memory resources, the application configured to report state and performance information responsive to REST requests from clients:
    providing the first REST request to the application contingent on satisfaction of predetermined conditions comprising a determination that current utilization of the application processing resources and the application memory resources by the application plus additional portions of the application processing resources and the application memory resources required to report the current state and performance information of the host to the client will not cause utilization of the application processing and memory resources to exceed predetermined limits; and returning an error message to the client responsive to a determination that the current utilization of the application processing resources and the application memory resources by the application plus the additional portions of the application processing resources and the application memory resources required to report the current state and performance information of the host to the client will cause utilization of the application processing and application memory resources to exceed the predetermined limits and a determination that a number of retries to satisfy the predetermined limits has reached a maximum number of retries.

13. The method of claim 12 wherein the application memory resources comprise a memory footprint of the application, and wherein verifying comprises determining that current utilization of the application memory footprint does not exceed a threshold.

14. The method of claim 12 wherein the application processing resources comprise a central processing unit on which the hosted application runs, and wherein verifying comprises determining that current utilization of the central processing unit does not exceed a threshold.

15. The method of claim 12 wherein verifying comprises comparing a threshold for projected utilization of the application processing resources with the currently utilized application processing resources in combination with the required application processing resources.

16. The method of claim 12 wherein verifying comprises comparing a threshold for projected utilization of the application memory resources with the currently utilized application memory resources in combination with the required application memory resources.

17. The method of claim 12 comprising updating an endpoint data set with the required application memory resources.

18. The method of claim 12 comprising retrying the determination that the current utilization of the application processing resources and the application memory resources by the application plus the additional portions of the application processing resources and the application memory resources required to report the current state and performance information of the host to the client will not cause utilization of the application processing and application memory resources to exceed the predetermined limits up to a maximum number of retries before returning the error message.

* * * * *